July 19, 1955

A. J. HOLMAN 2,713,285

FILM SHRINKAGE ADJUSTING, FOCUSING AND MASKING
UNIT FOR REVOLVING LENS WHEEL SYSTEM

Filed July 25, 1950

INVENTOR=
Arthur J. Holman

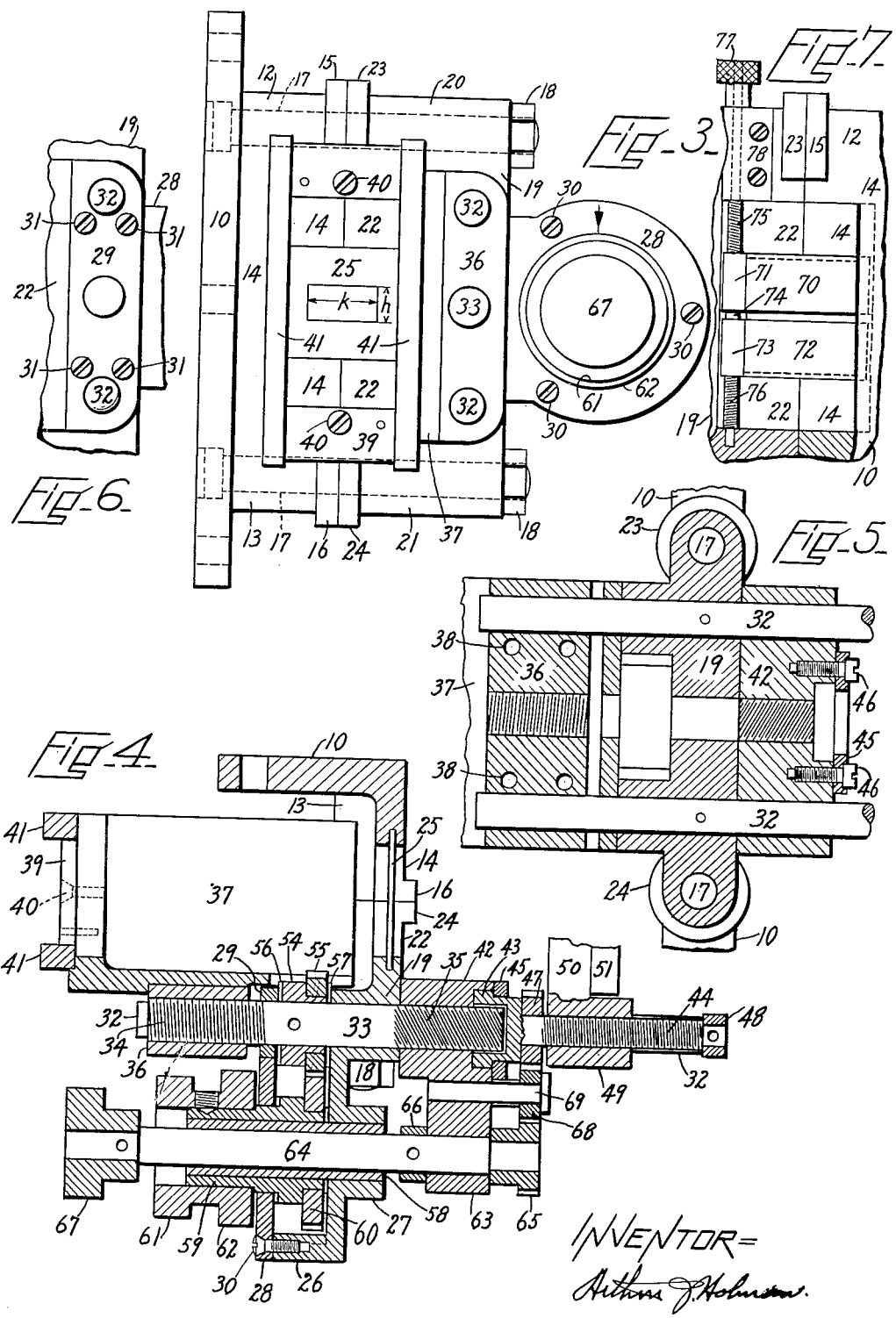

2,713,285
Patented July 19, 1955

2,713,285

FILM SHRINKAGE ADJUSTING, FOCUSING, AND MASKING UNIT FOR REVOLVING LENS WHEEL SYSTEM

Arthur J. Holman, Brighton, N. Y.

Application July 25, 1950, Serial No. 175,816

1 Claim. (Cl. 88—16.3)

My invention relates to optical rectifying apparatus for projecting, scanning or assessing action photographs recorded on motion picture film, wherein the images of photographs carried on successive film frames are fused, one into the other, to create a continuous, flicker-free screen or scanning image. To secure the highest resolution in this continuous screen image, the images of successive film frames must be superimposed in exact registration, and this requires the respacing of the optical elements comprising the rectifying system, to suit the particular degree of shrinkage in the film being projected, scanned or assessed. Adjustment of the optical system to compensate for varying degrees of film shrinkage, must be accomplished while maintaining optimum resolution in the image of each film frame as it is projected individually.

These requirements are satisfied, in some measure, for a two lens wheel (disk type wheels) optical rectifying system, by apparatus described in my Letters Patent of the United States No. 1,857,152, for Combined Focus and Image Placement Adjustment Means For Moving Picture Projectors, issued May 10, 1932. The present invention is applicable to single lens wheel projector and camera optical rectifying systems such as are described in my Letters Patent of the United States No. 1,957,457, for Optical Rectifying System For Moving Picture Projectors and Cameras, issued May 8, 1934. The present shrinkage adjustment control and focusing device is an improvement over the film shrinkage adjustment means employed in the projector mechanism described in Letters Patent of the United States No. 2,120,249, for Sound and Picture Aperture Unit and Film Feeding Mechanism, issued June 14, 1938. Film shrinkage adjustment mechanism is not shown, described or claimed in this patent. The present invention is applicable to cameras, flying spot television film scanners and other apparatus wherein my single revolving lens wheel and a stationary front component constitute the optical rectifying system.

It has been the special object of my invention to provide improved means whereby the slidably mounted aperture unit and the slidable mount for the front component of the objective of my single lens wheel optical rectifying system, may each be precisely and variously positioned along the optical axis, with respect to the revolving lens wheel, to maintain accurate image focus at all times while adjusting to secure exact registration of superimposed images for the particular degree of shrinkage in the film being projected, scanned or photographed upon. Another object is to provide single unit mounting for the aperture unit, the front component of the objective, the shrinkage adjustment control mechanism and the focusing means. Another object is to provide direct connection between the aperture unit and the sliding member controlling the positioning of the front component of the objective, through a single ratio rod having two threaded portions differing in helical angle. A further object is to provide direct gear drive for rotating the single control ratio rod, to any required degree, by turning a control knob calibrated in per cent film shrinkage, so the optical system may be preset to accommodate any film for which the shrinkage is known. A further object is to provide a focusing mechanism, including a control knob positioned concentric with and in close proximity to the shrinkage adjustment control knob.

A further important object of this invention is to provide a mask with a rectangular opening of height $h$, and width $k$, positioned immediately behind the revolving lens wheel, centered on the optical axis and so mounted in the new unit that masks containing rectangular apertures of other sizes and proportions may be easily substituted; or a mask having an aperture adjustable, both as to height and width, may be used.

My present film shrinkage adjusting device is a great improvement over the control mechanism described in Letters Patent No. 1,857,152, hereinbefore referred to, in that it functions without levers, connecting links and hinge pins. In my former control mechanism, there is considerable lost motion between the sliding aperture unit and the sliding front component mount due to (1) spring in the long levers and (2) clearance in the fitting of the several linkage hinge pins and fulcrum pins. Moreover, any increase in the forces required, in my former device, to slide the aperture unit and the front component mount, because of increased friction, amplifies the lost motion and results in further disproportionate displacement of optical parts as hand wheel 29 is turned. This disproportionate displacement causes considerable variation in focus of individual film frame images as the control mechanism is operated to secure exact registration in the superimposed images.

The present device, designed and constructed as a unit, includes an aperture unit, a mount for the front component of the objective, a member controlling the positioning of this mount; these three being slidably mounted on two parallel rods common to all three; a differentially threaded ratio rod, direct gear means for varying the angle through which the ratio rod is turned by operating a knurled knob carrying an integral index ring calibrated in percentage film shrinkage, a feed screw to move the mount for the front component of the objective with respect to the member controlling the positioning of this mount, gear means to turn this feed screw as required in focusing, by operating a second knurled knob positioned concentric with the first mentioned knurled knob, convenient means for masking the light beam at a position adjacent the lens wheel, to cut off stray and undesirable rays and for other purposes hereinafter fully described, and means for supporting the various elements in proper operating position with respect to the revolving lens wheel and the film feeding mechanism. This shrinkage adjustment and focusing control unit is new in optical rectifiers and its advantages, many of which will become apparent upon studying the drawings, will be described fully hereinafter.

My device may be best understood by reference to the accompanying drawings in which:

Fig. 3 is a rear view of my device, showing the rectangular opening through the mask.

Fig. 4 is a cross-section on line 4—4 of Fig. 1.

Fig. 5 is a partial cross-section on line 5—5 of Fig. 2.

Fig. 6 shows the face of one gear box cover which is hid from view in Fig. 3.

Fig. 7 shows the mounting for two parallel vanes, screw operated to vary the height of the aperture in a mask.

Figure 1:
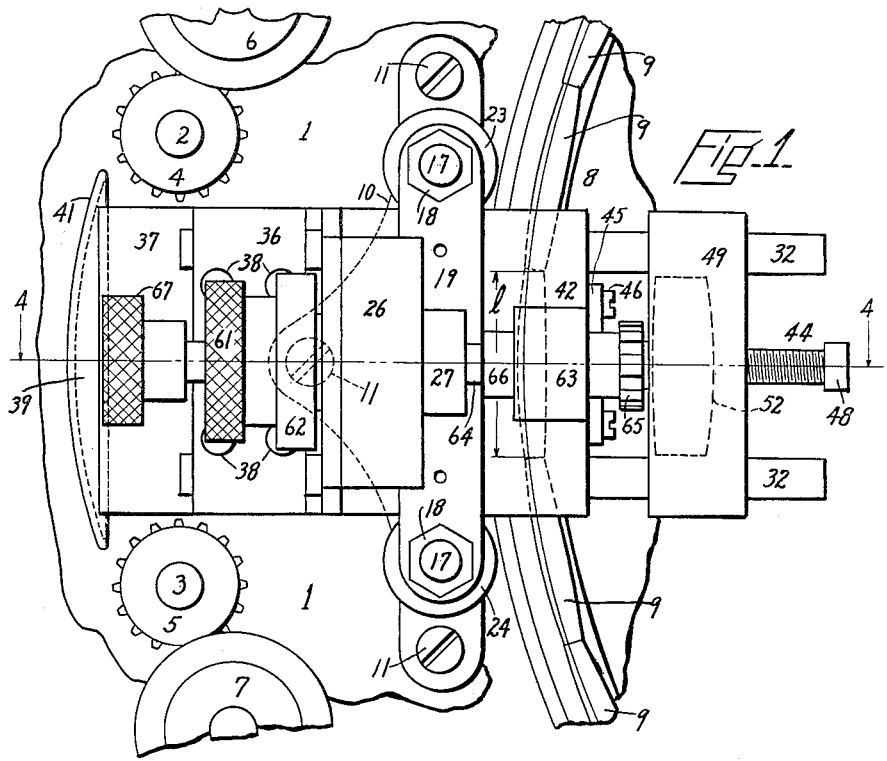
Fig. 1 is a side elevation of my device showing its position with respect to the revolving lens wheel and the film actuating sprockets in a projector mechanism.

Referring now more particularly to the drawings, 1 is the main frame of the projector mechanism wherein are suitably journaled shafts 2 and 3 whereon are secured the film sprockets 4 and 5 positioned in alignment immediately above and below the aperture unit and so actuated as to tension the film as it is drawn over the aperture plate. Film is retained in engagement with and accurately aligned on sprockets 4 and 5 by flanged idler rollers 6 and 7. The film feeding mechanism, including means for tensioning the film as it passes over the aperture unit, and the idler roller control means, is not included in the present invention but is the subject of my copending patent application Serial No. 196,490, filed November 18, 1950.

Revolving lens wheel 8, suitably supported for rotation in the projector mechanism and positioned with respect to main frame 1, as shown, carries lens elements 9 fixedly mounted in multiple on its periphery. The lens wheel is so organized that the optical axis of each lens element 9 coincides, momentarily, with the optical axis of the front component of the objective as each lens element 9 cuts across the optical axis of the projector: i. e., the instant a lens wheel element is centered on the axis of projection, the optical axis of this wheel element and the optical axis of the front (fixed) component of the objective are coincident. Each lens element 9, as it is carried in turn, into operative position, by the rotation of the lens wheel, becomes and constitutes a rear component of the objective system. Whenever two lens elements 9 are in operative position at the same time, they function simultaneously as rear components of the objective to provide the dissolve transition characteristic of the revolving lens wheel system. The lens wheel, including the multiple rear components 9, and the front component, constitute the revolving lens wheel optical rectifying objective. The optics of my single lens wheel optical rectifying system are described in Letters Patent of the United States No. 1,957,457 hereinbefore referred to.

A substantial base member 10 (Figs. 1, 2 and 3) is secured to and accurately positioned upon projector main frame 1 by three dowel screws 11. Base member 10 has integral cylindrical bosses 12 and 13 projecting outwardly therefrom and a web plate 14, integral with member 10, connects cylindrical bosses 12 and 13 throughout their length. Cylindrical bosses 12 and 13 terminate in heads 15 and 16 of somewhat larger diameter than the bosses. The plane of the faces of these heads passes through the optical axis of the projector. Dowel studs 17 having heads recessed in base member 10, are press fitted to prevent turning, in bores through cylindrical bosses 12 and 13 and are threaded on their free ends to take nuts 18.

A parallel rod supporting member 19 has integral cylindrical bosses 20 and 21 projecting therefrom and a web plate 22, integral with member 19, connects cylindrical bosses 20 and 21 throughout their length. Cylindrical bosses 20 and 21 terminate in heads 23 and 24, and are bored to slide smoothly, with minimum clearance, on dowel studs 17. The plane of the faces of heads 23 and 24 is square to the bores in cylindrical bosses 20 and 21 and, when parallel rod supporting member 19 is mounted on dowel studs 17 and nuts 18 are tightened, this plane also passes through the optical axis of the projector. When members 10 and 19 are assembled as described, the web plates 14 and 22 contain a square aperture centered on the optical axis of the projector and the walls of this aperture are slotted (Fig. 4) to receive a mask 25, the opening (Fig. 3) through which is of proper size and shape to pass only such light rays as are effective in producing clear, well defined images. The height $h$, and width $k$, of this opening in mask 25 have great significance as described hereinafter. Dowel studs 17 are of such length that, when parallel rod supporting member 19 and the parts carried thereon, are mounted in the projector, studs 17 will enter the bores in cylindrical bosses 20 and 21 and guide member 19 into final position without endangering lens wheel 8 and lens elements 9 carried on the periphery thereof.

Parallel rod supporting member 19 has integral gear box 26 projecting outwardly therefrom (Figs. 1, 2 and 4) and projecting centrally from one face of gear box 26 is integral cylindrical boss 27. Gear box 26 is enclosed by two cover plates 28 and 29 (Fig. 6), preferably of oilite or other anti-friction material, which are held in place by suitable screws 30 and 31. Member 19 contains three parallel bores the axes whereof lie in one vertical plane which is parallel to the plane of the faces of heads 23 and 24, of bosses 20 and 21. The axis of the central bore lies in the horizontal plane containing the optical axis of the projector and also the axis of cylindrical boss 27 on gear box 26. The axes of the other two parallel bores in member 19 are equally spaced from the axis of the central bore therein, and within these bores are press fitted and pinned parallel rods 32 which project forward and rearward from member 19 and parallel the optical axis of the projector. Ratio rod 33, mounted with a free turning fit in the central bore in member 19, is journaled in the central bore in oilite cover plate 29. The end portion 34 (Fig. 4) of ratio rod 33, projecting rearwardly from cover plate 29, is threaded with a single helical thread of a certain pitch. End portion 35 of ratio rod 33, projecting forwardly from the central bore in member 19, is threaded with a multiple helical thread of such pitch as to provide the correct relative displacement of the parts controlled by ratio rod 33 as the ratio rod is rotated.

The relative displacement of the film aperture plate and the front component of the objective required to compensate for varying degrees of film shrinkage, is determined by the characteristics of the lens wheel, i. e., the number of lens elements 9 comprising the periphery of the wheel, the focal length of these lens elements, and the radius of the circle whereon their optical centers are located. In association with the lens wheel shown in Fig. 1, ratio rod 33, when rotated, is required to displace the front component of the objective exactly four times the amount by which the film aperture plate is displaced, so, in the instant case, end portion 34 of ratio rod 33 carries a standard ⅜ inch thread having a pitch of 16 threads per inch, and end portion 35 carries a quadruple thread of the same equivalent fineness; i. e., 16 threads per inch.

Figure 2:
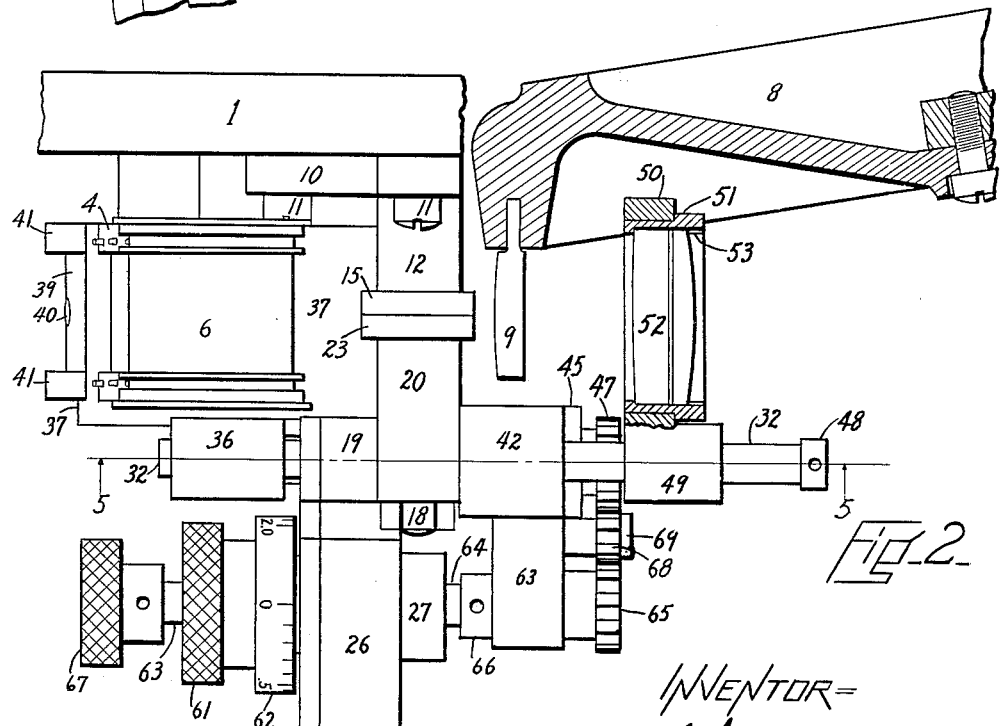
Fig. 2 is a plan view of the same showing, in cross-section, the lens wheel and the mount for the front component of the objective.

Aperture unit supporting block 36, preferably of sintered powdered metal and oil saturated, is bored to fit accurately on parallel rods 32, slides freely thereon, and contains a central bore which is threaded and chased to fit accurately the thread on end portion 34 of ratio rod 33. Aperture frame 37 is milled out (Fig. 4) to seat against the inner face of aperture unit supporting block 36 and is secured thereto by four rivets (Figs. 1 and 5). The rear face of aperture frame 37 is milled out to seat hardened steel aperture plate 39, which is aligned thereon by dowel pins and secured thereto by screws 40. Aperture plate 39 contains the usual elongated multiple-film-frame aperture (Fig. 3) associated with the revolving lens wheel system, and has raised runners 41 as indicated by the broken arc in Fig. 1.

Sliding member 42, controlling the positioning of the front component of the objective, is bored to fit accurately on parallel rods 32, slides freely thereon, and contains a central bore which is threaded and chased to fit accurately the quadruple thread on end portion 35 of ratio rod 33. A cylindrical recess (Figs. 4 and 5) concentric with the central bore in sliding member 42 provides a seat for the enlarged head 43 of focusing screw 44 and is retained therein without end play by oilite plate 45 containing a bore fitting accurately a surface of reduced diameter on the head of focusing screw 44. Plate 45 is secured to sliding member 42 by screws 46. The head 43 of focusing screw 44 is bored out to provide clearance for threaded end portion 35 of ratio rod 33. Press fitted on focusing screw 44 and mounted against the head thereof, is gear 47. A collar 48 is fitted on the turned end of focusing screw 44 and is pinned thereto.

Mount 49 for the front component of the objective, preferably made of sintered powdered metal and oil saturated, is bored to fit accurately and slide freely on parallel rods 32, and contains a central bore threaded and chased to fit focusing screw 4. Collar 48 on focusing screw 44 limits the forward movement of mount 49 and prevents it from sliding off parallel rods 32. Mount 49 has an integral ring 50 (Figs. 2 and 4) projecting therefrom at right angles to parallel rods 32, and the axis of the bore in ring 50 coincides with the optical axis of the projector. Within this bore in ring 50 is fitted and secured in the usual manner, the lens tube 51 wherein the front component 52 of the objective is retained by lens locking ring 53.

Differentially threaded ratio rod 33 is actuated rotatively and is retained from moving endwise through the central bore in parallel rod supporting member 19, in the following manner: Gear hub 54 (Fig. 4), carrying gear 55 press fitted thereon, is press fitted on ratio rod 33 and pinned thereto. Oilite thrust washers 56 and 57 surround ratio rod 33 and are, together, of just sufficient thickness to prevent end play of gear hub 54 in gear box 26 when cover plate 29 is seated thereon by tightening screws 31 (Fig. 6). Within a bore in cylindrical boss 27, integral with gear box 26, is press fitted oilite bushing 58 which carries rotatably mounted thereon gear hub 59, and gear 60 is press fitted on one end thereof. A cylindrical portion of gear hub 59, of somewhat smaller diameter, is journaled in a bore in cover plate 28 secured to gear box 26 by screws 30. Oilite thrust washers are provided at one end of gear hub 59 and between a shoulder thereon and cover plate 28 to prevent end movement of gear hub 59 when cover plate 28 is secured in position on gear box 26 by screws 30. The cylindrical portion of gear hub 59, of still smaller diameter, which projects through cover plate 28, has mounted thereon knurled knob 61 having integral index ring 62, the cylindrical outer surface of which is calibrated from 0 to 2 per cent, in tenths of one per cent, film shrinkage. Knurled knob 61 is set screwed to gear hub 59 in proper indexed position opposite the arrow on cover plate 28 (Fig. 3) after the unit has been assembled and adjusted as hereinafter described. Knurled knob 61 with integral index ring 62 is provided with suitable stops (not shown) which prevent its being turned beyond the 0 mark, in one direction, and beyond the 2.0 mark, in the other direction. The stops include a stop pin secured in cover plate 28 in line with the arrow thereon, and an annular slot milled in the end of index ring 62. The stop pin projects into this annular slot which extends, in circumference, one half the stop pin diameter beyond the graduations on index ring 62.

The focusing mechanism is actuated in the following manner: Sliding member 42, controlling the positioning of front component 52 of the objective, carries an integral boss 63 (Figs. 1, 2 and 4) projecting outwardly therefrom, and a bore in this boss is of the same diameter and exactly in line with the bore in bushing 58 press fitted in the bore in boss 27 on gear box 26. A shaft 64, freely rotatable in the bore in boss 63 and freely rotatable and slidable in oilite bushing 58, projects through boss 63 and carries press fitted on one end portion of somewhat smaller diameter, the gear 65. A collar 66, fitted on shaft 64, is pinned thereto to prevent end play of shaft 64 in boss 63. The other end portion of shaft 64, which projects through and beyond shrinkage adjusting knurled knob 61, has mounted thereon and pinned thereto focusing knurled knob 67. An intermediate gear 68, meshing with gear 65 on focusing control shaft 64 and with gear 47 on focusing screw 44, is supported rotatively on oilite stud 69 snugly fitted and secured in a bore in boss 63 on sliding member 42. Stud 69 is provided with a head and fitted with a sleeve, as shown in Fig. 4, to align gear 68 with gears 65 and 47.

A simple device for adjusting the height $h$, in the mask adjacent the lens wheel, is shown in Fig. 7. A thin vane 70 has an integral hub 71 along one vertical edge and this hub is tapped with a left hand thread. A similar vane 72 has an integral hub 73 along one vertical edge and this hub is tapped with a right hand thread. The vertical edges of vanes 70 and 72, opposite hubs 71 and 73, respectively, extend into a suitable slot in web plate 14 integral with base member 10 and are easily slidable therein. An adjusting rod 74, provided with a left hand threaded portion 75 fitting the threaded hub 71 on vane 70, and a right hand threaded portion 76 fitting the threaded hub 73 on vane 72, is suitably supported on web plate 22 integral with parallel rod supporting member 19. A knurled knob 77 is secured to the upper end of adjusting rod 74 where it projects above boss 20 on member 19. When assembling, vanes 70 and 72 are screwed all the way on threaded rod 74 before mounting on member 19. Before journaling the lower end of rod 74 in web plate 22, the vertical edges of vanes 70 and 72 are inserted in the vertical slot in web plate 14. A bracket 78, journaling adjusting rod 74 above threaded portion 75, is secured to member 19 by suitable screws. Turning knurled knob 77 clockwise brings adjacent edges of vanes 70 and 72 closer together; turning it counterclockwise, increases the separation between the vanes but adjacent edges of vanes 70 and 72 will always remain equally spaced from the optical axis. A similar arrangement of parallel vanes may be used to provide a mask aperture which is adjustable as to width.

The foregoing description of my device will enable the reader to acquire an understanding of the purpose this invention is intended to serve and how it functions in so doing. The device is provided with accurately made instrument gears fitted to give minimum back lash so the slightest rotation of control knob 61 will rotate differentially threaded ratio rod 33, and the scale of per cent film shrinkage on index ring 62 will indicate accurately the amount of film shrinkage for which the optical system is adjusted to produce exact registration in the superimposed images of two adjacent film frames centered on the aperture plate 39. Also any slight turning of focusing knob 67 will produce micrometer-like adjustment in the positioning of front component 52 of the objective with respect to the arcuate path traversed by the optical centers of lens elements 9 as lens wheel 8 is rotated.

Final adjustment of the unit is accomplished in the following manner: The projector is set up as a film viewer or assessor so the screen image may be observed critically and, preferably, with the aid of a hand magnifying glass. A suitable light source, such as a 75 watt, 10 volt concentrated filament incandescent lamp, will provide ample screen brightness and will cause no damage to the film, even though it is allowed to remain in the light beam for several hours. A good quality motion picture positive print of known shrinkage, say exactly 1.1 per cent, is threaded in the projector and the mechanism is turned slowly, by hand, till a frame line between two film frames is exactly centered on aperture plate 39. If the film has been properly threaded on film sprockets 4 and 5, the screen image will be in frame, the adjacent edges of two lens elements 9 on lens wheel 8 will be centered on the optical axis of front component 52 of the objective, and the screen image will comprise the images of the two film frames adjacent the frame line which is centered on aperture plate 39, moreover, each of the film frames will be contributing exactly one half of the light forming the composite screen image.

Unless some preliminary adjustments have been made, the film frame images on the screen will probably be out of focus and also out of register. The two images may be brought into critical focus by operating focusing knob 67: they can be brought into exact registration by operating shrinkage control knob 61, the set screw wherein has been tightened sufficiently so that differentially threaded ratio rod 33 will turn when knob 61 is turned. Focusing and image registering operations are repeated alternately until the sharpest focus and best registration are obtained in the composite screen image. Then the set screw in knob 61 is loosened, knob 61 is turned on gear hub 59 until the 1.1 per cent (i. e., the known shrinkage factor of the film) graduation of the scale on index ring 62 is exactly opposite the arrow on cover plate 28. The set screw in knob 61 is then screwed down hard on gear hub 59. As a final check on critical focus, the projector mechanism may be turned slowly by hand, until a film frame and a lens element 9 on lens wheel 8, are both exactly centered on the optical axis of the projector. With the optical system in this position, the screen image will be made up entirely of light passing through the one film frame centered on the aperture plate. Slight turning of focusing knob 67 will indicate if the system is actually in critical focus. The unit is then completely adjusted, and images of film frames on any motion picture film, irrespective of its shrinkage factor, will be projected on the screen sharply focused and in exact registration, provided the value on the percent shrinkage scale opposite the indicator arrow matches the actual shrinkage factor of the film.

My shrinkage adjustment control device may be adapted for use with any lens wheel having different characteristics, by merely substituting a differentially threaded ratio rod to suit the particular lens wheel. After the required ratio of movement of the aperture unit and the front component of the objective has been determined by calculation, based on optical characteristics of the lens wheel, as hereinbefore stated, a suitable differentially threaded ratio rod may be designed. For example; another design of revolving lens wheel requires a ratio of 3.6 to 1. A ratio rod to accommodate my present shrinkage adjustment control device to this lens wheel, will have, on one end portion, a single thread having a pitch of 18 threads per inch, and on the other end portion, a triple thread having a fineness equivalent to a pitch of 15 threads per inch; thus providing a ratio of 18 to 15⅔ or 18 to 5 which is exactly 3.6 to 1. Suitable combinations of different thread pitches and various multiples of threads may be found to provide the exact ratio required for practically any lens wheel design.

The mask 25 with the rectangular opening therethrough, is described hereinbefore as serving (1) to pass only such light rays as are effective in producing clear, well defined images and, stated negatively, (2) to cut off stray and undesirable light rays.

In Letters Patent of the United States No. 2,345,602 dated April 4, 1944, I have described a light source and condenser system in association with my revolving lens wheel objective system, which is highly satisfactory for television film scanning and for film assessing. When my present device is fitted with this light source and condenser system, I find that the composite screen image has the greatest range in tones (highlights, halftones and shadows) and the highest resolution when the opening in mask 25 is just large enough to pass the full condenser beam; i. e., when all light rays reaching the lens wheel are contained within the envelope surrounding the condenser beam. When using an arc lamp and suitable high aperture condenser system for large screen illumination in theatres, a mask having an opening which restricts all light rays reaching the lens wheel to the area occupied by the image of the arc at the lens wheel, produces maximum tone range and highest resolution in the screen image. Improvement in image quality gained by using the mask in this manner, is most marked at the higher illumination levels. When my device is used as a projector, it is fitted, preferably, with a mask having an opening matching the cross section of the condenser beam at the position occupied by the mask; i. e., the height $h$ of the aperture in the mask equals height $h$ of the condenser beam as shown in Fig. 1 of my Patent No. 2,345,602. Under these conditions, $h/l$ represents the fraction of the film frame cycle occupied by the dissolve transition; i. e., the period during which images of successive film frames are being fused into the composite screen image. When the optical system functions as camera or as television film scanner in association with a flying spot scanning tube, the rectangular aperture in mask 25 serves still another and different purpose; the height $h$ of the aperture determines the duration of exposure received by each film frame from light transmitted through the objective system. Suppose, for example, that the camera or flying spot television film scanner is operating at the constant speed of 24 frames per second, which means that 24 lens elements 9 are crossing the optical axis each second and 24 film frames are moving over the aperture plate each second. Stated another way, a lens element 9 on the lens wheel, is carried completely across the optical axis in 1/24 second, and, if height $h$ is infinitely small, light through each lens element 9 will pass to the film for just 1/24 second; i. e., just the length of time it takes a lens element 9 to cross the optical axis. But, if height $h$ is equal to height $l$ of a lens wheel element, the time some part of a lens element 9 is opposite the aperture in mask 25 will be doubled and the lens element 9 will transmit light to the film during 1/12 second. The factor by which the operating speed of the mechanism is multiplied to arrive at the film exposure time is $$\frac{h+l}{l}$$

This lengthened exposure, characteristic of revolving lens wheel cameras and flying spot television film scanners, is made possible because the revolving lens wheel functioning with the elongated multiple-film-frame aperture, permits exposure of two film frames simultaneously all during the interval when portions of two lens elements 9 (rear components) are opposite the opening in mask 25. This is just the reverse of the condition in intermittent cameras wherein the film pull down time and the necessary shutter closure period reduce the film exposure time. Herein lies one of the primary advantages of the revolving lens wheel camera, especially for television and radar scope recording and for high speed photography.

It is of interest to note that the width $k$ of the rectangular opening in mask 25 may be varied from very narrow up to the full width of a lens element 9 without any effect upon the optical rectifying objective other than that produced by opening the diaphragm on an ordinary objective. In other words, varying the width $k$ of the rectangular aperture in mask 25 produces only a diaphragming effect.

A mask having a rectangular aperture adjustable, independently, as to height and width, when used in close proximity to a single revolving lens wheel in combination with a front component (optical) and an elongated multiple-film-frame aperture, will function as a diaphragm, and will also function to regulate the duration of film exposure in a camera.

The function of mask 25, when my device is used as a projector with light source and condenser system, is to pass only such light rays as are effective in producing clear, well defined images of film frames overlying the aperture plate. Its purpose is to cut off from the lens wheel any and all light rays not contained within the envelope of the condenser beam, which light rays, if permitted to reach the screen, would degrade the range of tones and the resolution in the screen image.

Mask 25 has no effect whatever on the number of film frames the objective system will image, one above the other, in the screen plane at any given time. When the aperture plate, containing an elongated multiple-filmframe aperture, is fully illuminated by the condenser beam, the objective will image, in the screen plane, at times, all of the film frames overlying the aperture in the aperture plate. These extra images appearing above and below the image centered on the screen, may be blocked off by a suitable mask positioned some distance forward of the objective, or they may be redirected to register with the image on the screen, by means of the Optical Economizer described in my Letters Patent of the United States No. 2,241,403, issued May 13, 1941.

Having thus fully described my invention, what I claim is:

A film shrinkage adjusting and focusing unit, for use in combination with a single revolving lens wheel carrying rear components (optical) in multiple fixedly mounted on its periphery, comprising a pair of parallel rods, a parallel rod supporting member, an aperture unit, including an aperture plate, slidably mounted on said parallel rods, a front component (optical), a mount for said front component slidably supported on said parallel rods, a member controlling the positioning of said front component also slidably mounted on said parallel rods, a differentially threaded ratio rod connecting said last mentioned member with said aperture unit, a focusing screw connecting said last mentioned member with said mount for said front component, means, including a control knob and an index ring calibrated in per cent of film shrinkage, whereby said aperture plate and said front component may be properly positioned, in advance, along the optical axis, to accommodate any film for which the degree of shrinkage is known, and means, including a control knob, for rotating said focusing screw.

References Cited in the file of this patent

UNITED STATES PATENTS

| | | |
|---|---|---|
| 1,617,596 | Holman | Feb. 15, 1927 |
| 1,749,026 | Gentilini | Mar. 4, 1930 |
| 1,857,152 | Holman | May 10, 1932 |
| 1,913,488 | John | June 13, 1933 |
| 1,957,457 | Holman | May 8, 1934 |
| 2,345,602 | Holman | Apr. 4, 1944 |

FOREIGN PATENTS

| | | |
|---|---|---|
| 404,317 | France | Oct. 16, 1909 |
| 181,348 | Great Britain | Mar. 1, 1929 |
| 379,765 | Great Britain | Sept. 8, 1932 |